United States Patent [19]
Kanemitsu et al.

[11] Patent Number: 5,586,799
[45] Date of Patent: Dec. 24, 1996

[54] UPPER BODY STRUCTURE OF A VEHICLE

[75] Inventors: Norihiko Kanemitsu; Manabu Tamura, both of Hiroshima; Koh Nakao, Hiroshima-ken; Yukari Kato, Hiroshima; Katsumi Ejima, Hiroshima-ken; Noboru Yoshii, Higashihiroshima, all of Japan

[73] Assignee: Mazda Motor Corporation, Hiroshima-ken, Japan

[21] Appl. No.: 524,958

[22] Filed: Sep. 8, 1995

Related U.S. Application Data

[63] Continuation of Ser. No. 151,392, Nov. 12, 1993, abandoned.

[30] Foreign Application Priority Data

Nov. 11, 1992 [JP] Japan .................. 4-083576 U

[51] Int. Cl.⁶ ............................................. B62D 25/04
[52] U.S. Cl. ...................... 296/203; 296/202; 296/30; 296/188

[58] Field of Search .................... 296/188, 192, 296/205, 29, 30, 202, 203

[56] References Cited

U.S. PATENT DOCUMENTS

| | | | |
|---|---|---|---|
| 1,838,852 | 12/1931 | Ledwinka | 296/192 |
| 2,075,936 | 4/1937 | Graebner | 296/192 |
| 4,669,776 | 6/1987 | Harasaki | 296/192 X |
| 4,699,419 | 10/1987 | Kawase et al. | 296/192 |
| 4,883,309 | 11/1989 | Miyazaki | 296/192 X |
| 4,964,672 | 10/1990 | Fujii | 296/192 |
| 5,061,009 | 10/1991 | Harasaki et al. | 296/192 |

FOREIGN PATENT DOCUMENTS 63-122175  8/1988  Japan .

*Primary Examiner*—Dennis H. Pedder
*Attorney, Agent, or Firm*—Keck, Mahin & Cate

[57] ABSTRACT

An upper body structure for a car body includes a hollow front pillar, which includes inner and outer front pillar panels shaped so as to form a column space in the front pillar. The front pillar is connected to an upper portion of a dash panel by a gusset configuration.

7 Claims, 6 Drawing Sheets

UPPER BODY STRUCTURE OF A VEHICLE

This is a continuation of application Ser. No. 08/151,392, filed on Nov. 12, 1993, now abandoned.

BACKGROUND OF THE INVENTION

1. Field of the Invention

The present invention relates to a structure of the upper section of a vehicle body and, more particularly, to an upper body structure around center pillars.

2. Description of Related Art

An upper body section of a car body includes right and left front pillars, each front pillar being comprised of an outer pillar panel and an inner pillar panel secured to each other and being provided with a pillar reinforcement panel disposed along the outer pillar panel. Brackets, through which a door is hinged, are secured to gussets disposed inside the outer pillar panel.

Such an upper body structure is known from, for instance, Japanese Unexamined Patent Publication No. 63-122175. In the upper body structure described in the above-mentioned publication, which is shown in FIG. 10, of this publication a front pillar, which is bent backward at its upper half portion, comprises inner and outer pillar panels, upper half portions of which are formed with flanges extending backward and secured to each other so as to form a generally triangular reinforcement section. The lower portion of the center pillar is provided with a gusset having a U-shaped cross section. This gusset is placed in contact with inner surfaces of the inner and outer pillar panels and has an extension extending backward into the reinforcement section so as to be secured between flanges of the inner and outer pillar panels.

However, with the upper body structure, the structural strength between the front pillar and a dash panel is not sufficient, so that the upper half portion of the center pillar is relatively poor in structural rigidity when twisted.

SUMMARY OF THE INVENTION

It is a primary object of the invention to provide an upper body structure for a car body in which the structural rigidity between a dash panel and a center pillar is increased so as to improve the strength of the center pillar against twisting.

The aforegoing object is accomplished by providing an upper body structure for a car body in which an upper portion of the dash panel is connected to a hollow front pillar, comprised of inner and outer front pillar panels which are shaped so as to form a column space in the front pillar, by means of a gusset configuration. The gusset configuration includes a first gusset disposed outside the front pillar and transversely extending laterally from the front pillar for connecting the inner front pillar panel to the upper portion of the dash panel, and a second gusset disposed inside the front pillar and having a partition wall extending approximately vertically in the column space so as to longitudinally divide the column space into front and rear sections for connecting the inner front pillar panel to the outer front pillar panel.

Specifically, the second gusset has a fitting flange extending approximately vertically along the inner front pillar panel through which the second gusset is secured to the inner front pillar panel, and the first gusset has a fitting flange extending along the inner front pillar panel through which the first gusset is secured to the inner front pillar panel.

The configuration having a partition wall of the second gusset provides an increase in connecting strength between the front pillar and the dash panel, so as to prevent the front pillar from being deformed backward and to improve the rigidity of the front pillar against twisting.

The second gusset is further provided with a partition wall extending transversely in the column space for dividing the column space into upper and lower sections. This improves the rigidity of the front pillar against twisting.

BRIEF DESCRIPTION OF THE DRAWINGS

The above and other objects and features of the present invention will be clearly understood from the following description with respect to a preferred embodiment thereof when considered in conjunction with the accompanying drawings, in which.

DESCRIPTION OF THE PREFERRED EMBODIMENT

Because body configurations are well known to those skilled in the art, the present description will be directed in particular to elements forming parts of, or cooperating with, the novel configuration in accordance with the present invention. It is to be understood that elements not specifically shown or described can take various forms well known to those skilled in the art.

It should be noted that the terms "inner" and "outer" used in the specification indicate directions toward the inside and outside of a car body, respectively.

Figure 1:
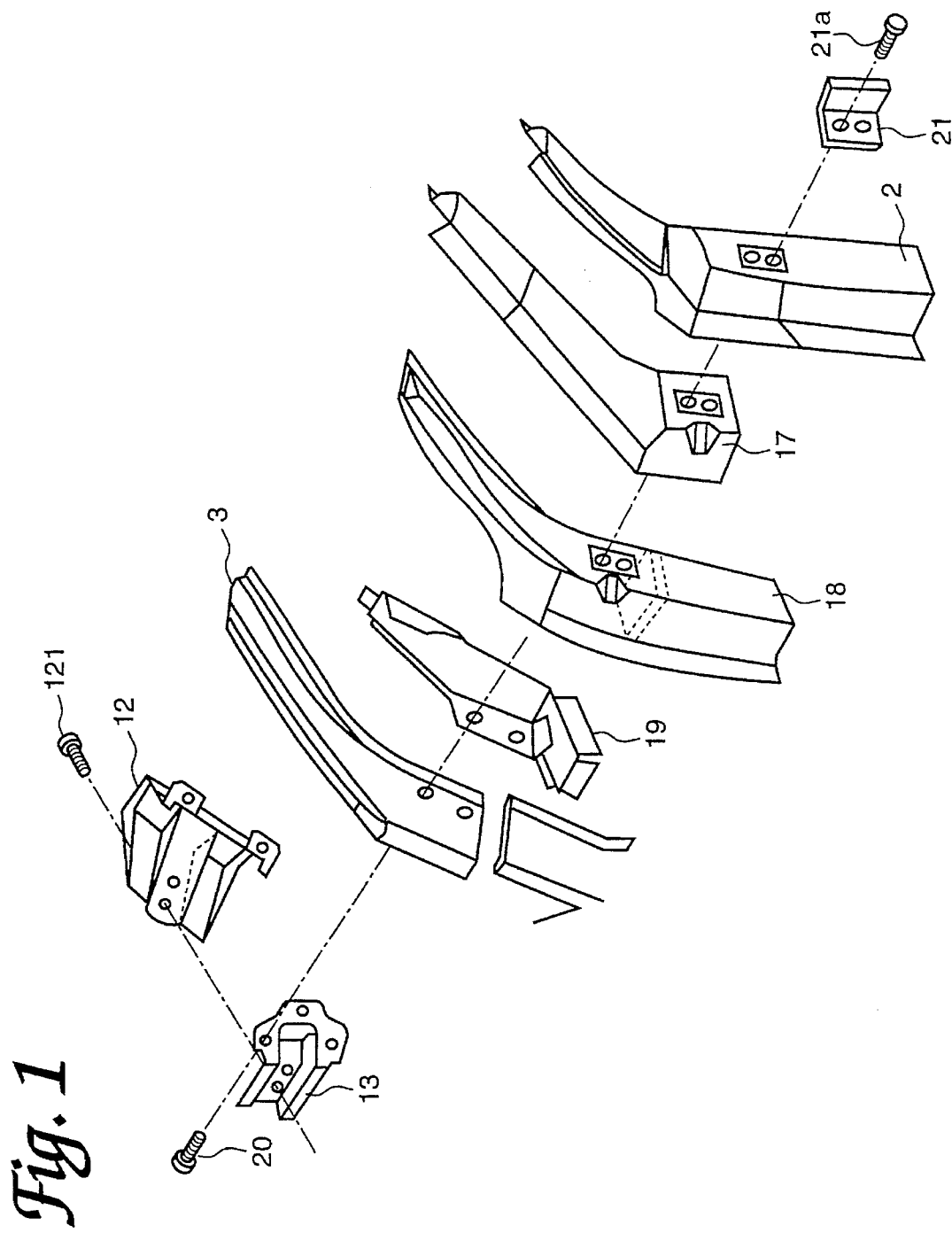
FIG. 1 is an exploded perspective view of a front pillar of the upper car body structure in accordance with a preferred embodiment of the present invention.
Figure 2:
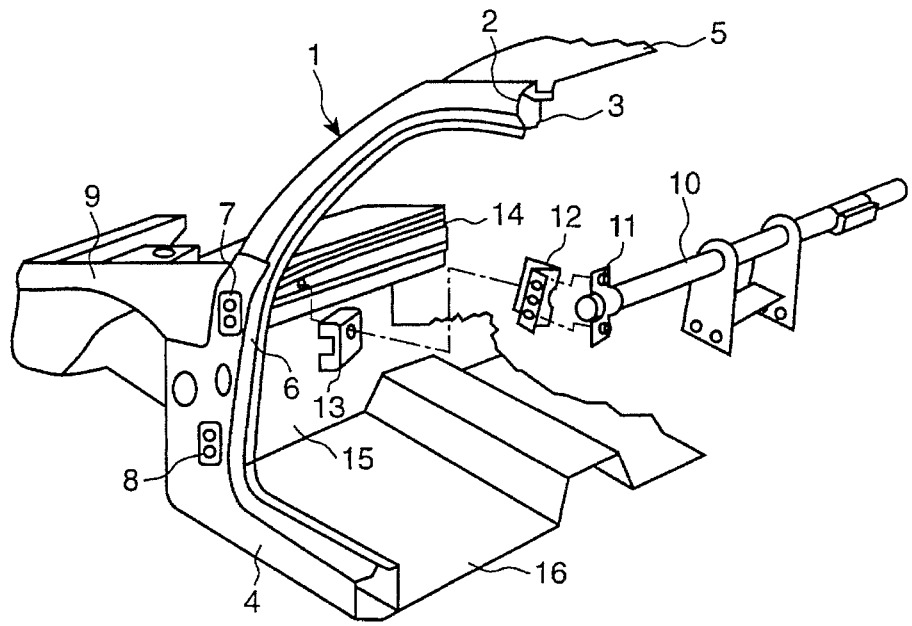
FIG. 2 is a perspective view of the upper car body structure around the front pillar as viewed from the outside.

Referring to the drawings in detail and, in particular, to FIGS. 1 and 2, a front pillar 1 is bent at its mid portion 6 (see FIG. 2) and is comprised of an outer front pillar panel 2 and an inner front pillar panel 3 secured to each other so as to form a column space therein or have a closed cross section. Inside the center of pillar 1, there are provided a front pillar reinforcement 17 and a hinge reinforcement 18 arranged in order from the outside to the inside, which are secured to one another in this order. The curved portion of the center pillar 1 where a door hinge is attached is provided with an inside gusset 19, positioned at the bent portion 6 between the inner front pillar plate 3 and the hinge reinforcement 18, which will be described in detail later. This inside gusset 19, the inner front pillar panel 3 and a panel gusset 13 with a fitting flange 132 attached to the bent portion of the inner front pillar panel 3 from the inside are fixed all together by bolts 20. The front pillar 1 is provided with a door hinge 21. The door hinge 21, the outer front pillar panel 2, the front pillar reinforcement 17 and the hinge reinforcement 18 are fixed all together by bolts 21a. An instrument panel bracket 12 is secured to the panel gusset 13 by bolts 121.

Figure 3:
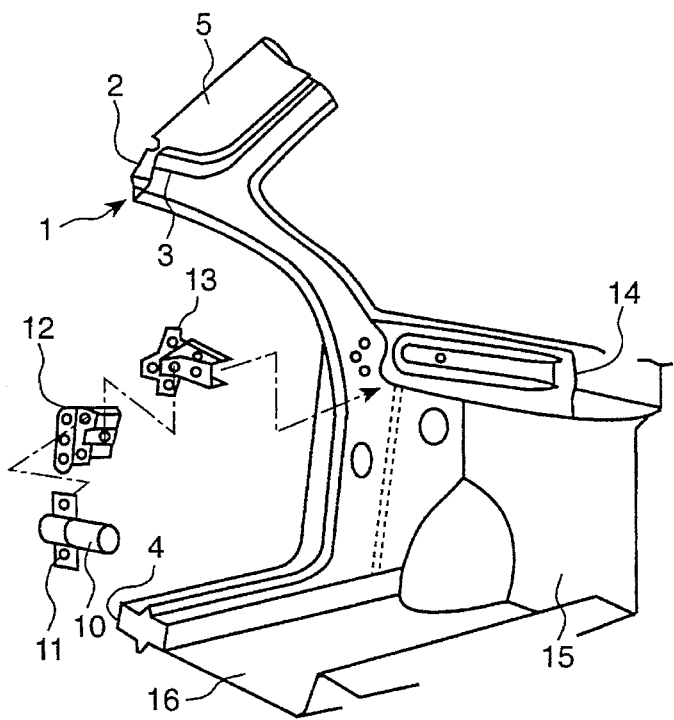
FIG. 3 is a perspective view of the upper car body structure around the front pillar as viewed from the inside.
Figure 4:
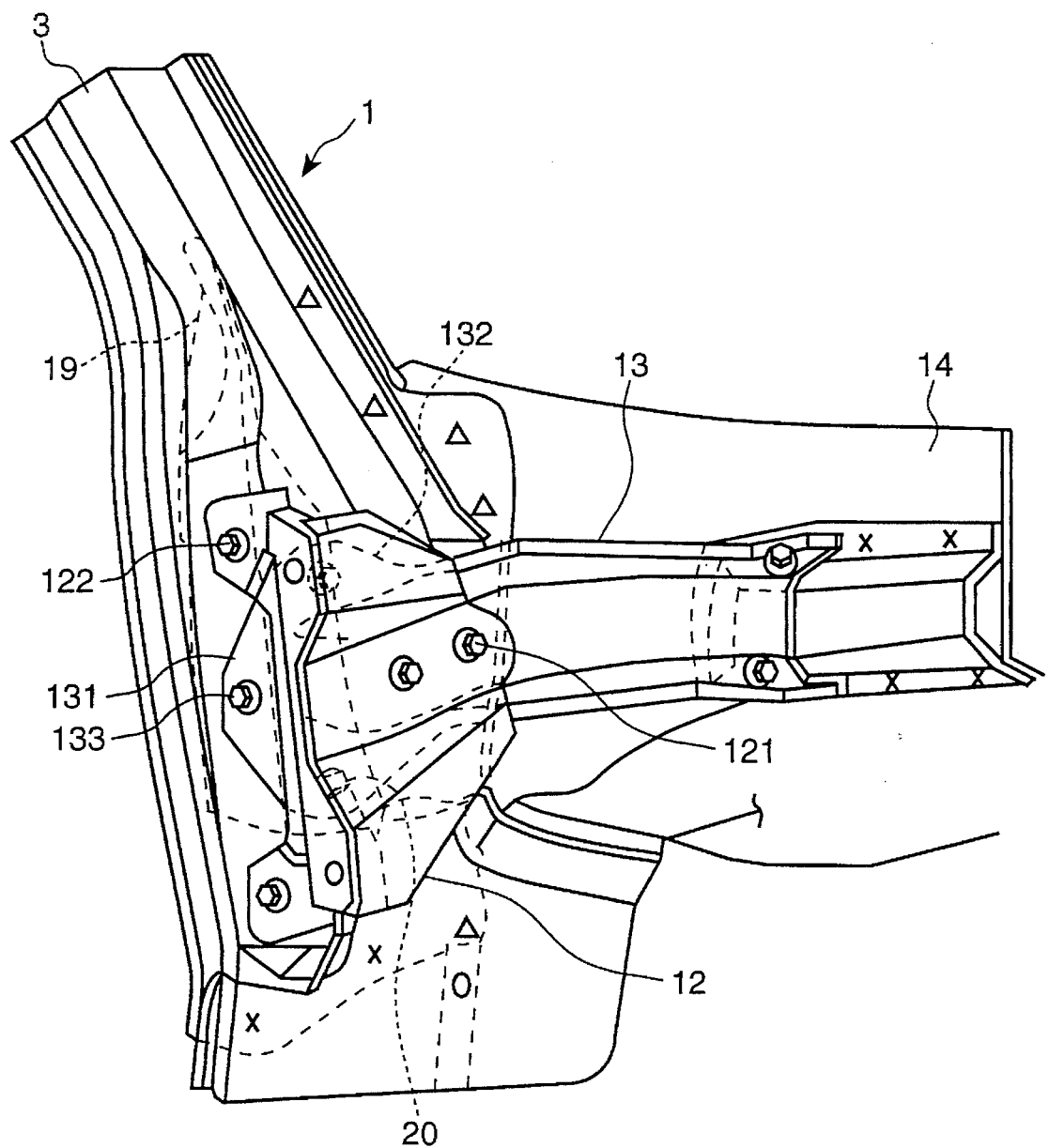
FIG. 4 is an enlarged view of the essential portion of the front pillar as viewed from the inside.

Referring to FIGS. 2 to 4, the front pillar 1, whose upper half portion extends inclining backward and whose lower half portion extends approximately vertically, is secured at its lower end to a side sill 4 and at its upper end to a roof 5. The front pillar 1 is provided with an upper hinge fitting 7 secured to the bent portion 6 thereof and a lower hinge fitting 8 secured to the lower half portion thereof near the side sill 4. The panel gusset 13 is formed with a front fitting flange 132 by means of which it is secured to the inner front pillar panel 3 by bolts 20 and side upper and lower side fitting flanges 132 by means of which it is secured to the inner front pillar panel 3 through the inside gusset 19 by bolts 133. The panel gusset 13 is further secured to one transverse end of an upper dash panel 14. The instrument panel bracket 12 is secured to a mount portion 131 by bolts 121 and to the inner front pillar panel 3 by bolts 122. An instrument panel support 10 is secured at its end to the instrument panel bracket 12 by means of a fixing bracket 11. There are provided a front fender 9 secured to the bent portion 6 of the front pillar 1, a lower dash panel 15 extending between right and left front pillars 2, and a floor panel 16 extending between right and left side sills 4.

Figure 5:
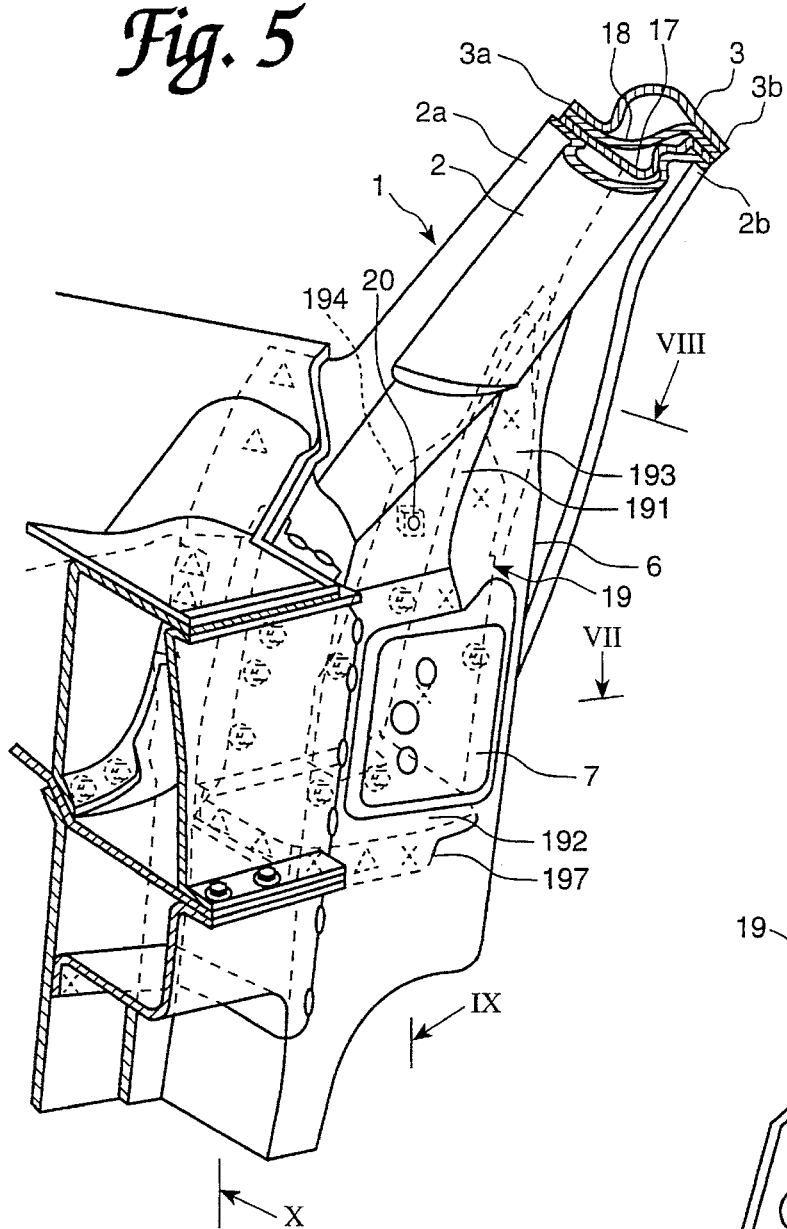
FIG. 5 is an enlarged view of the essential portion of the front pillar as viewed from the outside.

Referring to FIG. 5, the inner and outer front pillar panels 2 and 3 are formed with front edges of flanges 2a and 3a, and rear edges or flanges 2b and 3b, respectively, which are secured to each other so as to form a hollow structure of the front pillar 1. Inside the hollow front pillar 1 the front pillar reinforcement 17 and hinge reinforcement 18 are disposed so as to extend along the outer front pillar panel 2.

Figure 6:
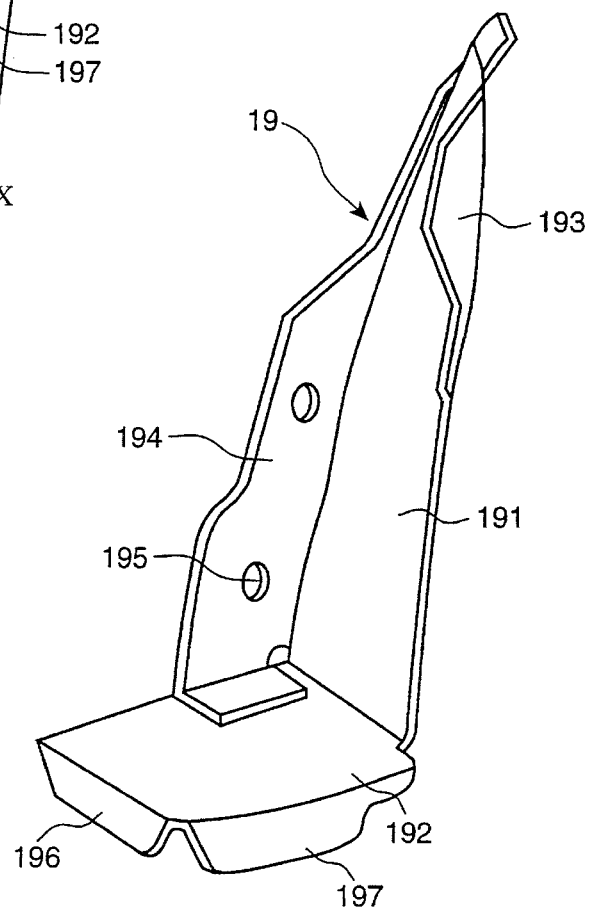
FIG. 6 is a perspective view of an inside gusset.

Referring to FIG. 6, the inside gusset 19 has a generally L-shaped configuration comprising a vertical wall 191 tapered upward and a generally rectangular base wall 192 formed integrally with and extending perpendicularly from the vertical wall 191. The vertical wall 191 is integrally formed with an upper fitting flange 193 extending from the top to the middle of the vertical wall 191 and a lower fitting flange 194 extending from the middle to the bottom of the vertical wall 191. This lower fitting flange 194 is formed with holes 195 through which the bolts 20 are fastened. The base wall 192 is integrally formed with a front end fitting flange 196 and a side fitting flange 197 extending downward from front and side edges of the base wall 192, respectively.

Figure 7:
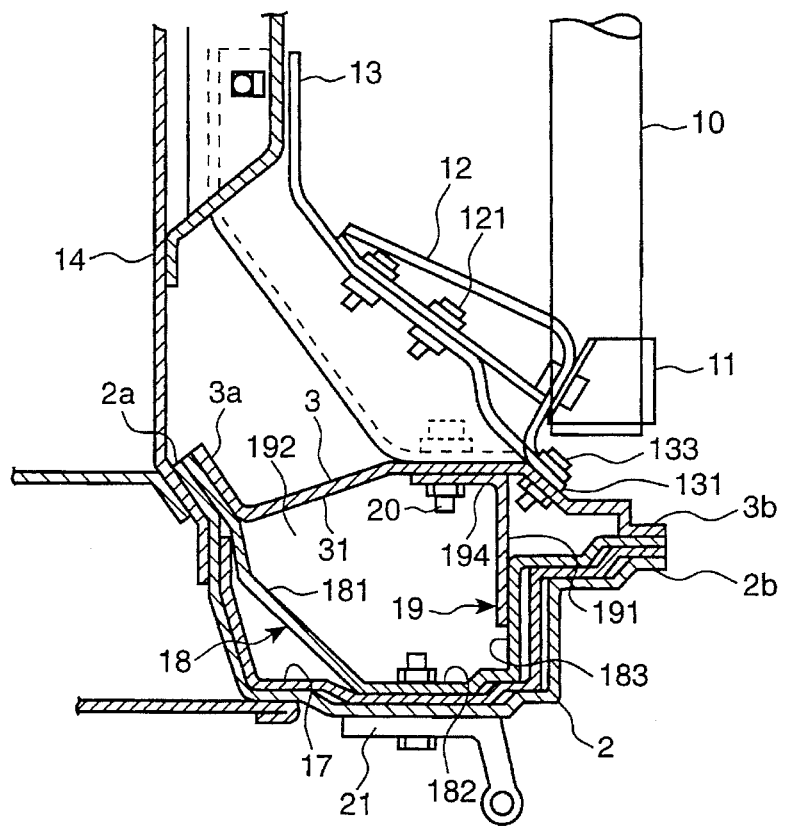
FIG. 7 is a cross-sectional view of FIG. 5 taken along line VII—VII.
Figure 8:
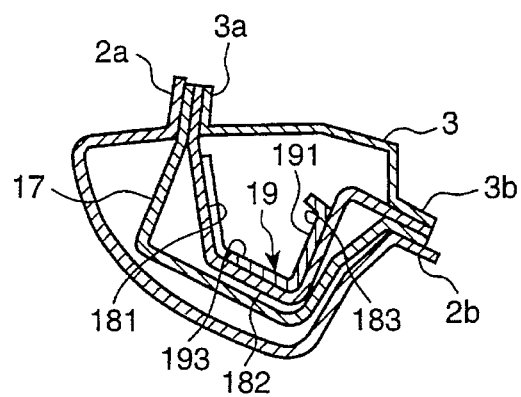
FIG. 8 is a cross-sectional, view of FIG. 5 taken along line VIII—VIII.
Figure 9:
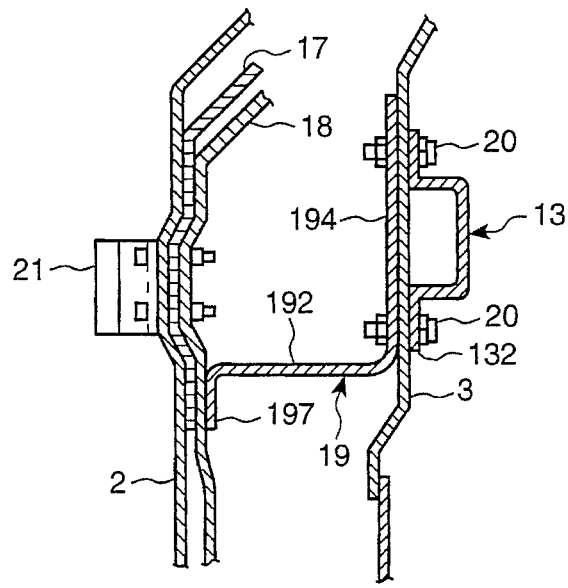
FIG. 9 is a cross-sectional view of FIG. 5 taken along line IX—IX.
Figure 10:
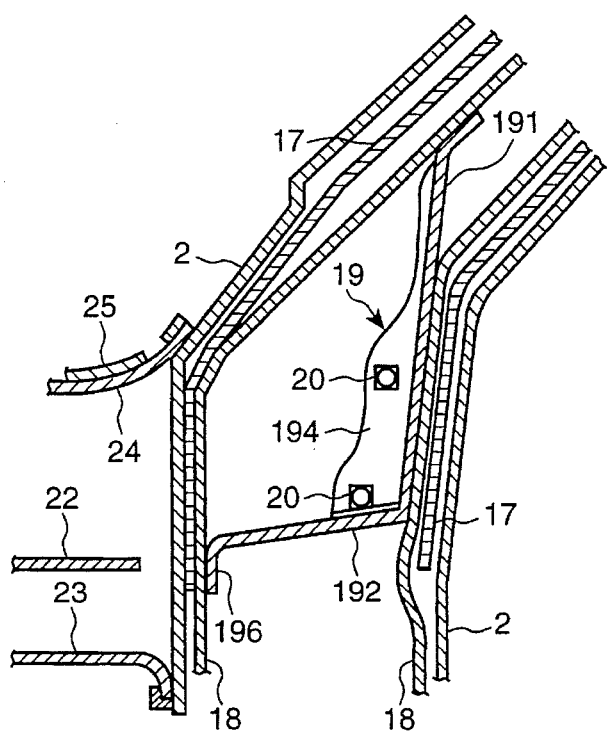
FIG. 10 is a cross-sectional view of FIG. 5 taken along line X—X.

Referring to FIGS. 7 to 10, the inside gusset 19 is secured to a front inner surface portion 181 of the hinge reinforcement 18 at its upper fitting flange 193 (FIG. 8) and to a side wall inner surface portion 182 of the hinge reinforcement 18 at its lower fitting flange 194 (FIG. 7). Further, the inside gusset 19 is secured to a rear inner surface portion 183 of the hinge reinforcement 18 at its lower half portion (FIGS. 7 and 8). The lower fitting flange 194 of the inside gusset 19 is located in contact with the outer surface 31 of the inner front pillar panel 3 opposite to the fitting flange 132 of the panel gusset 13 and bolted to the inner front pillar panel 3 along with the fitting flange 130 of the panel gusset 13 (FIG. 9). As FIGS. 7–10 show, the inside gusset 19 is disposed entirely inside of a space defined by the front inner surface portion 181, the side wall inner surface portion 182, the rear inner surface portion 183 and the outer surface 31 of the inner front pillar panel 3.

The base wall 192 of the inside gusset 19 has a shape in conformity with the shape of a transverse cross section defined by the inner front pillar panel 3 and the pillar reinforcement 8. The front end fitting flange 196 of the base wall 192 of the inside gusset 19 is secured to the front wall inner surface portion 181 of the hinge reinforcement 18, and the side fitting flange 197 of the base wall 192 of the inside gusset 19 is secured to the side wall inner surface portion 182 of the hinge reinforcement 18. Thus, the interior of the front pillar 1 is divided into upper and lower sections by the base wall 192 of the inside gusset 19.

It is to be understood that although the present invention has been described with respect to a preferred embodiment thereof, various other embodiments and variants may occur to those skilled in the art, which fall within the scope and spirit of the invention. Such other embodiments and variants are intended to be covered by the following claims.

What is claimed is:

1. An upper body structure for a car body comprising:

inner and outer front pillar panels forming a hollow front pillar having a vertical lower section and an inclined upper section which is bent rearward from a top of said vertical lower section;

a reinforcement extending inside of the hollow front pillar from the vertical lower section to the inclined upper section for structurally reinforcing a part of the hollow front pillar, said reinforcement including a front inner surface portion, a side wall inner surface portion and a rear inner surface portion; and a gusset, disposed entirely inside of a space defined by said front inner surface portion, said side wall inner surface portion, said rear inner surface portion and an outer surface of the inner front pilar panel, having a wall extending in said space approximately vertically so that said wall abuts with said rear inner surface portion in said vertical lower section and said front inner surface portion in said inclined upper section so as to divide the space into front and rear sections.

2. An upper body structure as defined in claim 1, and further comprising an extra gusset disposed inside of the vehicle and transversely extending laterally from the hollow front pillar for connecting the inner front pillar panel to an upper portion of a dash panel of the car body.

3. An upper body structure as defined in claim 2, wherein the gusset having said wall has a fitting flange, extending approximately vertically along the inner front pillar panel, through which the gusset having said wall is secured to the inner front pillar panel.

4. An upper body structure as defined in claim 2, wherein the extra gusset has a fitting flange, extending along the inner front pillar panel, through which the extra gusset is secured to the inner front pillar panel.

5. An upper body structure as defined in claim 4, wherein the extra gusset and the gusset having said wall are secured to the inner front pillar panel with the flanges of both of the gussets bolted to the inner front pillar panel.

6. An upper body structure as defined in claim 1, wherein said gusset has a wall extending transversely in the space so as to divide the space into upper and lower space portions.

7. An upper body structure as defined in claim 6, wherein said gusset has a fitting flange which extends approximately vertically along the inner front pillar panel to the wall extending transversely in the space.

* * * * *